United States Patent Office 3,640,999
Patented Feb. 8, 1972

3,640,999
PROCESS FOR PREPARING SUBSTITUTED
1,4-DIAZACYCLOHEPTANES
Alberto Bonvicini and Giuseppe Cantatore, Terni, Italy, assignors to Montecatini Edison S.p.A., Milan, Italy
No Drawing. Filed Oct. 10, 1967, Ser. No. 674,114
Claims priority, application Italy, Oct. 14, 1966, 28,858/66
Int. Cl. C07d 53/02
U.S. Cl. 260—239 BC                                5 Claims

ABSTRACT OF THE DISCLOSURE

Process for preparation of alkyl-substituted 1,4-diazacycloheptanes of the general Formula 1

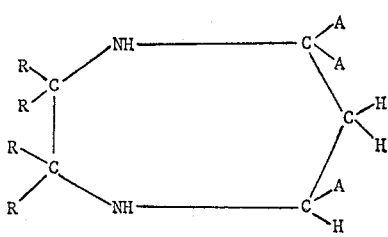

wherein R may be the same or different and is a hydrogen or an alkyl group having from about 1 to 12 carbon atoms and A may be the same or different and is selected from the group consisting of hydrogen and an alkyl group having from about 1 to 12 carbon atoms, this process comprising reacting, in the presence of an acid catalyst, an ethylenediamine of the general Formula 2

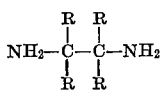

wherein R is as previously defined, with a saturated aliphatic ketone of the formula R'—CO—R', where the R' may be the same or different and is an alkyl group having from about 1 to 12 carbon atoms, and thereafter subjecting the resulting material to catalytic hydrogenation.

BACKGROUND OF THE INVENTION (1) Field of the invention

The present invention relates to a new process for the preparation of substituted 1,4-diazocycloheptanes (homopiperazines of hexahydro-1,4-diazepines) of the general Formula 1

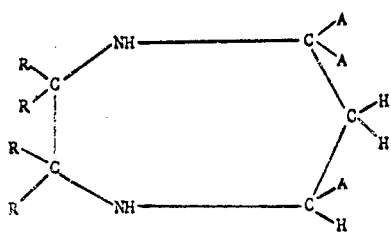

wherein the R radicals may be the same or different and may be a hydrogen or an alkyl group, the alkyl group preferably having from about 1 to 12 carbon atoms, and A may be the same or different and is an alkyl group preferably having from 1 to 12 carbon atoms.

(2) Description of the prior art

Syntheses of homopiperazines have been carried out heretofore by various methods, such as effecting reductive cyclization of cyanoethyl derivatives of ethylene diamine, effecting hydrolysis of the reaction products obtained from dihalogen derivatives with diarylsulphonylethylenediamine, and effecting catalytic hydrogenation of alkyl substituted 1,4-diazacycloheptenes.

In our copending U.S. application Ser. No. 591,687, filed Nov. 3, 1966, now U.S. Pat. No. 3,557,086 issued Jan. 19, 1971, there is described the preparation of alkyl-substituted homopiperazines by catalytic hydrogenation of the reaction mixtures obtained from the reaction of ethylene-diamines of the general formula 2

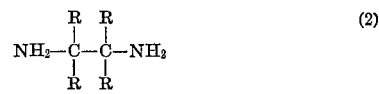

with aliphatic alpha-beta-unsaturated carbonyl compounds of the general formula

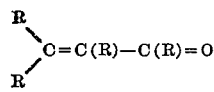

wherein R is as previously defined.

The present invention provides a new process for the preparation of alkyl-substituted homopiperazines, whereby one may conveniently obtain alkyl-substituted homopiperazines by starting from saturated ketones (such as, e.g., acetone, methylethylketone, or the like). Such ketone compounds are cheaper and more readily found on the market than those required according to the process disclosed in our aforementioned U.S. application, (alpha-beta-unsaturated ketones such as mesityl oxide, 3- methyl-3-pentene-2-one, or the like).

It is known that by hydrogenating the reaction mixtures of ethylenediamine with carbonyl compounds (reducing alkylation), N-substituted or N,N'-disubstituted ethylenediamines are obtained. (See Pearson et al., J.A.C.S., 68, 1225–9, 1946; R. G. Shepherd et al., J. Med. Pharm. Chem., 58, 23–35, 1962.). For instance, starting from ethylene diamine and acetone, N,N'-diisopropylethylenediamine is obtained, as shown hereinafter:

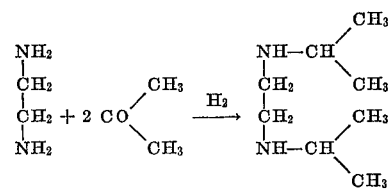

SUMMARY OF THE INVENTION

We have now surprisingly found that, if before the hydrogenation, the two reactants are brought together for a certain time in the presence of a suitable catalyst having an acid character, then after hydrogenation, derivatives of homopiperazine are obtained. By operating according to the invention, starting with acetone and ethylene diamine, there is obtained 5,5,7-trimethylhomopiperazine instead of N,N'-diisopropyl-ethylenediamine, as indicated hereinafter:

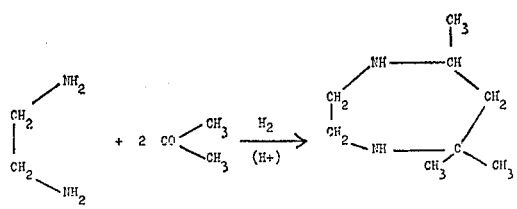

The process of the present invention thus involves subjecting to catalytic hydrogenation the reaction mixture obtained by reacting, in the presence of acid type catalysts, ethylenediamines of the general Formula 2

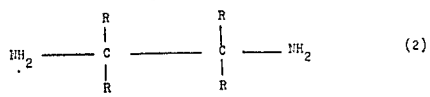

(wherein the R's may be the same or different and may be a hydrogen atom or an alkyl group, preferably having from about 1 to 12 carbon atoms) and carbonyl compounds of the general formula R'—CO—R' wherein the R' radicals may be the same or different and are alkyls, preferably having from about 1 to 12 carbon atoms.

DESCRIPTION OF THE PREFERRED EMBODIMENTS

As catalysts having an acid character there may be employed organic acids, such as formic acid, acetic acid, ptoluene-sulphonic acid or the like; inorganic acids such as hydrochloric acid, hydrobromic acid, hydroiodic acid, nitric acid, or the like; salts of said acids with amines such as ethylenediamines of the Formula 2, pyridine, morpholine, or the like; halogens (Cl, Br, I or F), or salts having an acid character such as, e.g., ammonium chloride, aluminum chloride, ammonium nitrate, magnesium nitrate, or the like. The amount of acid-type catalyst is preferably from about 0.1% to 10% by weight of the total weight of the reactants.

The preliminary reaction, in the presence of a catalyst of acid character, between an ethylene diamine and the saturated ketone is carried out preferably in the absence of solvents, but it alternatively may be carried out in the presence of alcohols such as methyl alcohol, ethyl alcohol, or the like, or in the presence of ethers or hydrocarbons.

The preliminary reaction is generally carried out by mixing together the reactants at a temperature desirably from about −15° C. to +30° C., after which the temperature should be maintained between about 10° and 80° C. for from about 1 to 100 hours. The reaction mixture is then subjected to hydrogenation in the presence of a suitable catalyst.

As catalysts suitable for effecting hydrogenation there may be employed conventional hydrogenation catalysts. Platinum is a preferred catalyst, either as the form of $PtO_2$-Adams (Gilman, Blatt, Organic Synthesis, vol. I, page 463—Wiley & Sons, N.Y. 1948) or as the form of Pt-supported on coal. Other known hydrogenation catalysts that are suitable include palladium, nickel, or the like.

The hydrogenation may be carried out without addition of a solvent to the preliminary reaction mixture, or by adding thereto alcohols such as methyl alcohol, ethyl alcohol or the like, ethers, or hydrocarbons.

The hydrogenation is preferably carried out at a temperature of from about 15° C. to 100° C., at a hydrogen pressure preferably from about 5 to 50 atmospheres, and for a period preferably of from about 2 to 20 hours. The reactants, an ethylene diamine and an aliphatic ketone, are desirably employed in a molar ratio of 1:2. It is also possible, however, to employ an excess of the ketone or of the diamine, preferably an excess of the ketone.

The aliphatic derivatives of the homopiperazines of the present invention may be used as intermediate compounds for the synthesis of organic compounds employable in the pharmaceutical field, for the preparation of polymeric materials containing nitrogen such as polyamines (i.e. by means of a condensation with epichlorohydrin), polyamides (i.e. by means of a condensation with dicarboxylic acids), polyurea (i.e. by means of a condensation with toluenediisocyanate), polyurethanes (i.e. by means of a condensation with an alkylene-bis-chloroformate) and for similar uses. The following examples will further illustrate the present invention; all parts are by weight unless otherwise stated.

EXAMPLE 1

5.5 ml. of aqueous $HNO_3$ 65% (weight/weight) were added with stirring to 278.4 g. (4.8 moles) of acetone cooled to −15° C. 120 g. (2 moles) of anhydrous ethylene diamine were then added dropwise with constant stirring, the addition being at such a rate so as not to exceed a temperature of 30° C. The mixture was kept for 24 hours at 18–20° C., followed by the addition of 200 ml. of methanol thereto, and the whole was then hydrogenated in the presence of 0.5 g. of $PtO_2$-Adams for 8 hours at 20–25° C., under a pressure of 15 atmospheres.

After separating the catalyst by filtration, the solvent was removed by distillation. The residue was then fractionated under reduced pressure (14 mm. Hg), in the presence of 10 g. of NaOH thereby obtaining 199 g. (yield 70%) of 5,5,7-trimethylhomopiperazine (boiling point 74–75° C./14 mm. Hg; $n_D^{20}=1.4708$).

EXAMPLE 2

120 g. (2 moles) of anhydrous ethylene diamine were added dropwise with constant stirring to 238 g. (4.1 moles) of acetone cooled to −10° C. containing 5 g. of glacial acetic acid the addition being at such a rate as to not exceed 30° C.

The mixture was kept for 3 days at 18–20° C., then diluted with 200 ml. of methanol, followed by being subjected to hydrogenation in the presence of 0.5 g. of $PtO_2$-Adams for 8 hours at 15–20° C. and a pressure of 30 atmospheres.

After separation of the catalyst and the solvent, the residue was fractionated under reduced pressure (17 mm. Hg), in the presence of 10 g. of NaOH, obtaining 185 g. (yield 65%) of 5,5,7-trimethyl-homopiperazine (boiling point 77–79° C./17 mm. Hg; $n_D^{20}=1.4709$).

EXAMPLE 3

11.5 ml. of aqueous 36.5% HCl were added with stirring to 278.4 g. (4.8 moles) of acetone cooled at −14° C. 120 g. (2 moles) of anhydrous ethylenediamine were added dropwise while stirring, the addition being at such a rate so as not to exceed a temperature of 30° C. The mixture was maintained for 24 hours at 18–20° C., and then 200 ml. of methanol were added. The whole was then subjected to hydrogenation for 6 hours at 20–25° C. and a pressure of 30 atmospheres in the presence of $PtO_2$-Adams (0.5 g.). After separation of the catalyst and solvent, the residue was fractionated under reduced pressure (16 mm. Hg) in the presence of 10 g. of NaOH, obtaining 194 g. (yield 68%) of 5,5,7-trimethyl-homopiperazine (boiling point 77–78° C./16 mm. Hg; $n_D^{20}=1.4707$).

EXAMPLE 4

5.5 ml. of 65% $HNO_3$ were added while stirring to a solution of 120 g. (2 moles) of anhydrous ethylene diamine in 300 ml. of methanol. Thereafter, while cooling with a stream of water, 238 g. (4.1 moles) of acetone were added dropwise at such a rate that the temperature did not exceed 30° C. The mixture was kept for 24 hours at 18–20° C. The mixture was then subjected to hydrogenation at a pressure of 40 atmospheres (1) for 3 hours at 20–25° C. and then (2) for 3 hours at 70° C., in the presence of 0.10 g. of $PtO_2$-Adams. After removing the catalyst and the solvent, the residue was fractionated under reduced pressure (20 mm. Hg) in the presence of 10 g. of NaOH thereby obtaining 174 g. (yield 61%) of 5,5,7 - trimethyl-homopiperazine (boiling point 81–82° C./20 mm. Hg; $n_D^{20}=1.4710$).

EXAMPLE 5

148 g. (2 moles) of 1,2-propylenediamine were gradually (in small amounts) and with constant stirring added to 278.4 g. (4.8 moles) of acetone cooled to −15° C., to which there had previously been added 5.5 ml. of aqueous 65% HNO₃, the diamine addition being at such a rate as not to exceed a temperature of 30° C. The mixture was maintained for 24 hours at 15–20° C. and then 250 ml. of methanol were added thereto. The whole was subjected to hydrogenation in the presence of 0.5 g. of PtO₂-Adams for 8 hours under a pressure of 30 atmospheres at 20–25° C.

After having removed the catalyst and the solvent, the residue was fractionated under reduced pressure (20 mm. Hg), in the presence of 10 g. of NaOH, obtaining 201 g. (yield 64%) of tetramethyl-homopiperazine (boiling point 84–85° C./20 mm. Hg; $n_D^{20}=1.4608$).

EXAMPLE 6

120 g. (2 moles) of anhydrous ethylene diamine were added, in small amounts and under constant stirring and cooling in order not to exceed a temperature of 40° C., to 288 g. (4 moles) of methylethylketone to which had been previously added 23 ml. of aqueous 36.5% HCl. The mixture was maintained for 90 hours at 18–20° C., and then was diluted with 200 ml. methanol. The whole was subjected to hydrogenation in the presence of 0.5 g. of PtO₂-Adams for 6 hours under 30 atmospheres pressure at 20–25° C.

After removing the catalyst and the volatile products, the residue was fractionated under reduced pressure (14 mm. Hg) in the presence of 15 g. of NaOH, obtaining 146 g. (yield 43%) of 5-methyl-5,7-diethyl-homopiperazine (boiling point 109–110° C./14 mm. Hg; $n_D^{20}=1.4742$).

Various modifications and variations may be made in the details of the performance of the present invention without departing from the spirit and scope of the present invention.

Having thus described our invention, what we desire to secure and claim by Letters Patent is:

What is claimed is:

1. A process for the preparation of alkyl substituted 1,4-diazacycloheptane of the formula:

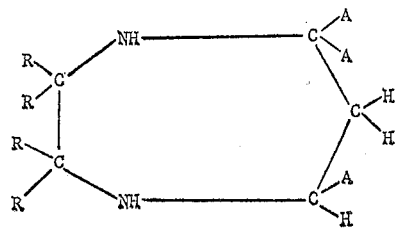

wherein each R is selected from the group consisting of hydrogen and an alkyl group having 1 to 12 carbon atoms and each A is selected from the group consisting of methyl and ethyl groups, this process comprising reacting, in the presence of an acid catalyst, an ethylenediamine of the formula:

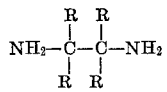

wherein R is as defined above, with a saturated aliphatic ketone of the formula R'—CO—R', wherein each R' is selected from the group consisting of methyl and ethyl groups, and thereafter subjecting the resulting material to catalytic hydrogenation.

2. The process of claim 1 wherein said diamine of the Formula 2 is selected from the group consisting of ethylene diamine and 1,2-propylenediamine.

3. The process of claim 1 wherein said saturated aliphatic ketone is acetone.

4. The process of claim 1 wherein said saturated aliphatic ketone is methylethylketone.

5. The process of claim 1 wherein the acid catalyst is selected from the group consisting of hydrochloric acid, nitric acid and acetic acid.

References Cited

UNITED STATES PATENTS 3,040,029  6/1962  Poppelsdorf et al. ____ 260—239

FOREIGN PATENTS 1,047,785  12/1958  Germany _____ 260—239

OTHER REFERENCES

Hickenbottom, Reactions of Organic Compounds, (London, 1948), p. 168.

Sprague, Chemical Abstracts, vol. 54, cols. 12155–6 (1960).

ALTON D. ROLLINS, Primary Examiner

UNITED STATES PATENT OFFICE
CERTIFICATE OF CORRECTION

Patent No. 3,640,999          Dated February 8, 1972

Inventor(s) Alberto Bonvicini and Giuseppe Cantatore

It is certified that error appears in the above-identified patent and that said Letters Patent are hereby corrected as shown below:

Column 1, line 28, delete "selected"; line 29, delete "from the group consisting of hydrogen and"; line 50, "of", first occurrence, should read -- or --.

Column 3, line 20, "ptoluene" should read --p-toluene--.

Column 6, line 17, delete "of the Formula 2".

Signed and sealed this 26th day of December 1972.

(SEAL)
Attest:

EDWARD M. FLETCHER, JR.
Attesting Officer

ROBERT GOTTSCHALK
Commissioner of Patents